Patented Feb. 17, 1931

1,793,357

UNITED STATES PATENT OFFICE

CHARLES H. BROWN, OF NEENAH, WISCONSIN

COMPOSITION OF MATTER

No Drawing. Application filed April 19, 1928. Serial No. 271,412.

This invention relates to a composition of matter to be used as a binder for fibrous material, and has for its object to provide, in a manner as hereinafter set forth, a binder for fibrous material for imparting thereto fire-retarding and resisting characteristics or to enhance such characteristics if the fibrous material possesses the same.

It is well known that red wood bark, without treatment of any kind possesses characteristics that will resist and prevent the spread of fire, whether the bark be in its natural state or threaded into felt-like fibre, and that the binder material now generally used for such fibre to provide a wall board or mass that can be used as a filler has the effect of destroying the natural resistance to fire possessed by the red wood bark. To preserve and enhance the natural fire retarding and resisting characteristics of the red wood bark fibre, as well as providing other fibrous materials with fire retarding and resisting characteristics is the primary object of the invention, and which is attained by a binder therefor, in accordance with this invention and which will be hereinafter more specifically referred to.

A binder, in accordance with this invention for and to maintain and enhance the fire resisting and retarding characteristics of fibrous material, or to provide fibrous material with such characteristics, consists of a liquid composition comprising an ammonium element such as ammonium phosphate, boracic acid, an amorphous element such as dextrine (light or dark as best suited for the specific purpose for which the binder is to be used) or starch, and water.

When ammonium phosphate crystals are used as the ammonium element in the preparation of the composition, the manner of preparing the same consists in providing an aqueous ammonium phosphate-boracic acid solution by dissolving one pound of ammonia phosphate crystals and one and one half ounces of boracic acid in one gallon of water. An aqueous solution of dextrine or starch is then formed by dissolving it in five gallons of warm water. The amount of dextrine or starch to be used will vary depending on the use to which the composition is to be put;—preferably under ordinary conditions the amount employed will be five pounds of dextrine or starch to five gallons of water. The greater the proportion of dextrine or starch used, the more effective the resulting mixture will be as a binder for the fibrous substances with which the composition is ultimately combined to form fire-resisting wall board, a liquid or other allied purposes. The two solutions are then combined to form the binder.

The resulting composition is to be used as a binder for any fibrous matter such as paper, paper fibre, wood pulp, cellulose of any kind, cork fibre, flax or cane fibre, etc., when the fibrous matter is manufactured in any manner into wall boards or other similar products to be intended for building or other puropses, in the construction of fibre retarding boards, layers, insulation in building operations where the fibrous matter and binder are projected against surfaces by any suitable means, or used as a covering for water, steam or other pipes.

The purpose of the composition described and referred to is designed to serve as a binder for fibrous material with which it may be used, and it will act to prevent fire from spreading in buildings where wall boards or filling between joists etc., made from fibrous matter are treated with the composition. Fibrous matter treated with the composition described will prevent the spread of fire and will not burn unless subjected to flame generated from the outside.

It is thought the many advantages of a composition in accordance with this invention and for the purposes referred to can be readily understood, and although the preferred embodiment of the invention is as illustrated and described, yet it is to be understood that changes in the details of the proportions of the ingredients of the composition can be had which fall within the scope of the invention as claimed.

What I claim is:

1. A composition for use in connection with fibrous material to bind and impart a fire resisting characteristic thereto and for preserving such characteristic consisting solely of ammonium phosphate, boracic acid, dextrine and water, the proportion of the ammonium phosphate being greater than that of the boracic acid, and the proportion of the dextrine being greater than the ammonium phosphate.

2. A composition for use in connection with fibrous material to bind and impart a fire resisting characteristic thereto and for preserving such characteristic consisting solely of solution formed from one pound of an ammonium phosphate, one and one-half ounces of boracic acid and one gallon of water, combined with a mixture of five pounds of dextrine and five gallons of warm water.

In testimony whereof, I affix my signature hereto.

CHARLES H. BROWN.